United States Patent

[11] 3,547,125

| [72] | Inventor | Luc A. Tagnon<br>Saint-Mande, France |
|---|---|---|
| [21] | Appl. No. | 709,303 |
| [22] | Filed | Feb. 29, 1968 |
| [45] | Patented | Dec. 15, 1970 |
| [73] | Assignee | Societe Des Lunetiers, Temkine & Cie<br>Paris, France<br>a French corporate body |
| [32] | Priority | March 10, 1967 |
| [33] | | France |
| [31] | | No. 98,281 |

[54] PORTABLE PHOTOCOAGULATOR
4 Claims, 9 Drawing Figs.

[52] U.S. Cl. .................................................. 128/303.1
[51] Int. Cl. .................................................. A61b 17/36

[50] Field of Search ............................................. 128/303.1,
395, 396

[56] References Cited
UNITED STATES PATENTS
3,348,547  10/1967  Kavanagh ..................... 128/395
3,417,754  12/1968  Smart ........................... 128/395

*Primary Examiner* — L. W. Trapp
*Attorney* — Robert E. Burns and Emmanuel J. Lobato ABSTRACT: A portable photocoagulator consisting of an ophthalmoscope with built-in laser, which comprises, housed in a common reference tube, a laser, an optical head and means for centering on the one hand said laser in relation to said optical head and on the other hand said laser in relation to said common tube.

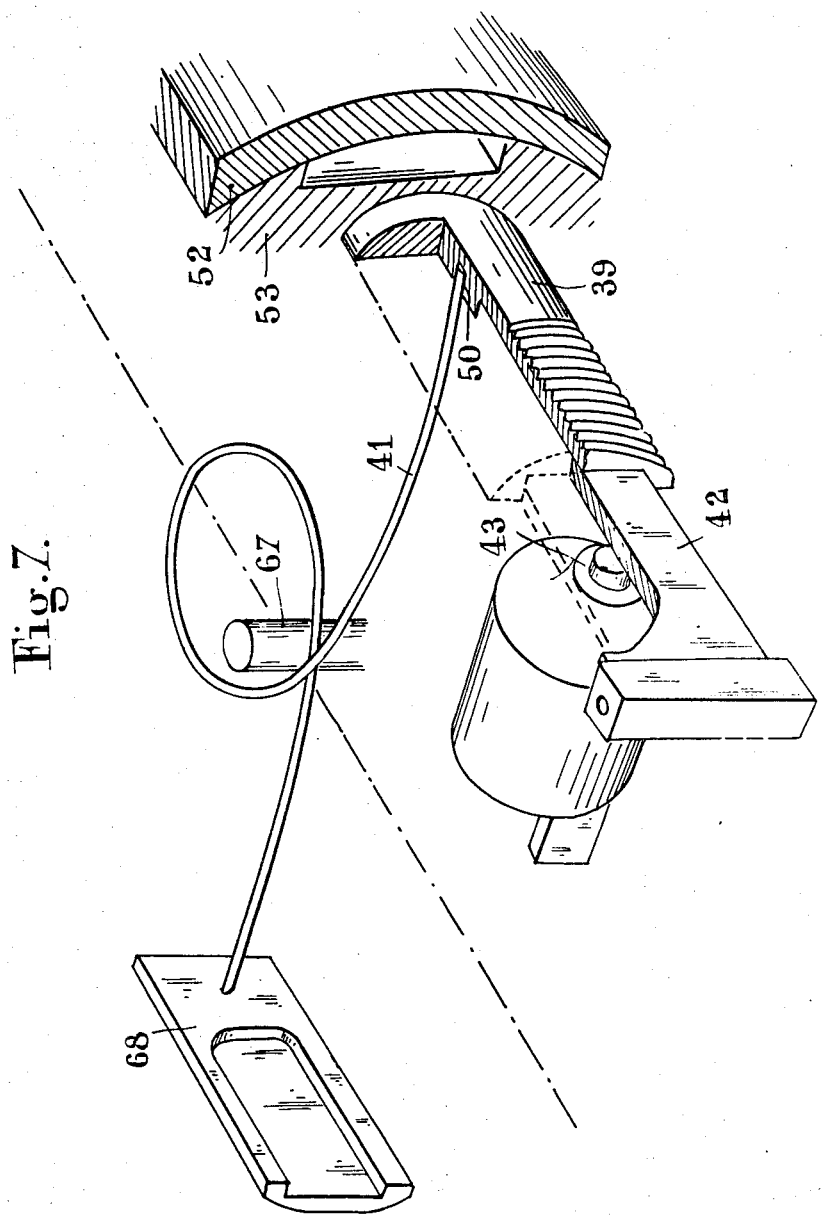

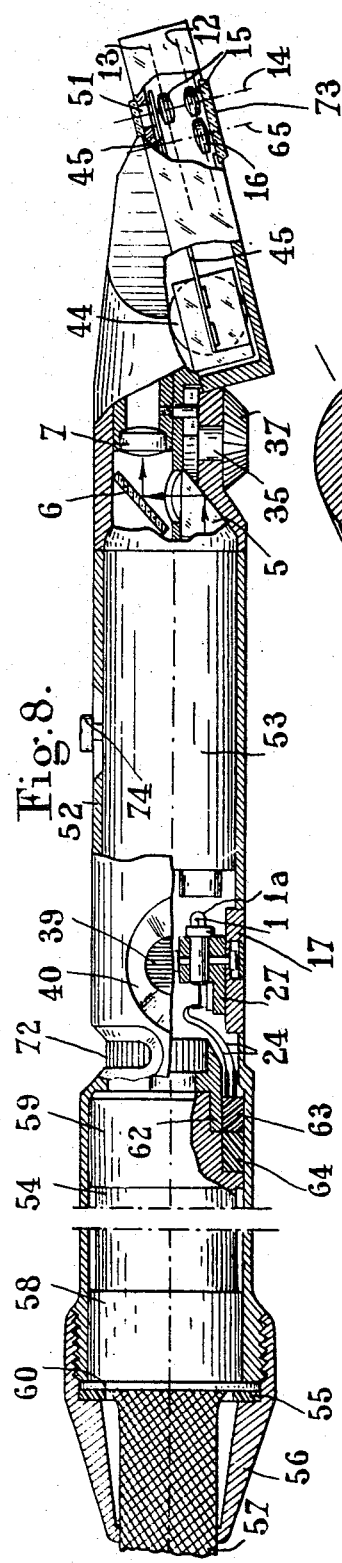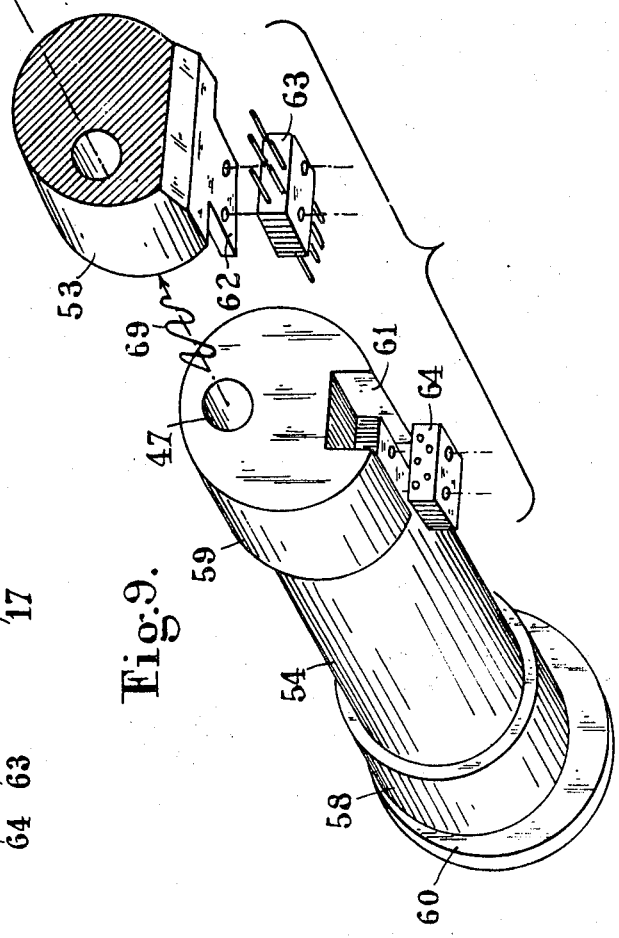

PORTABLE PHOTOCOAGULATOR

BACKGROUND OF THE INVENTION

It is known to associate an ophthalmoscope with a laser for obtaining a photocoagulator. The function of the ophthalmoscope is to provide means for illuminating and observing the interior of the eye while projecting the image of crosslines on the retina. The laser is then superposed thereto so that the eye will cause it to converge towards the center of the crosslines. The thus concentrated energy produces the photocoagulation which may prevent or treat ophthalmic diseases such as detachment of the retina.

This superposition has hitherto been obtained EMBODIMENT using various methods all attended by various inconveniences. Thus, for instance, when using the laser the physician disposes across the observation axis a mirror which blocks his field of vision; at the end of the movement he releases the laser and directs the laser beam towards the patient's eye according to the initial axis of observation. Under these conditions, the physician loses sight of the retina as he actuates the mirror, and therefore a certain lack of precision, aggravated by the play existing in the mirror mounting, is introduced in the laser operation.

On the other hand, the introduction of the laser beam takes no account, as a rule, of the patient's ametropia; under these conditions it is not possible to select beforehand an impact dimension having a given energy density. This is attended by retina perforations, focal concentrations in the vitreous humour, etc.

Finally, as the necessary laser energy values vary considerably from one patient to another (due to the different chromatisms of the retina) the range of adjustment of the energy level frequently depart from the limits of stability and reproducibility of a laser.

SUMMARY OF THE INVENTION

It is therefore an essential object of this invention to provide an ophthalmoscope with built-in laser which comprises, in a same reference tube, a laser, an optical head and means for centering these elements in relation to each other and also the laser in relation to said tube.

The resulting assembly is capable of producing photocoagulations having predetermined and reproducible characteristics, independently of prevailing conditions and substantially without any practical interruption in the observation.

The optical head and subsequently its association with the laser in the apparatus of this invention, of which the overall dimensions approximate those of a simple observation ophthalmoscope, will firstly be described hereinafter.

The observation is carried out according to the basic principles of conventional ophthalmology. Thus, two lens-supporting discs (Recoss' discs) are used for compensating the differential ametropia between the physician and the patient. The beam from the light source passes through a set of lenses of one disc for partially compensating the patient's ametropia. A movable assembly permits of focusing a test (crosslines) on the retina to determine a real or virtual conjugate plane thereof where, of course, an intermediate image of same nature, of this test, can be seen. By using a perforated, selective or partial-reflection mirror (which may even be retractable), the laser beam is superposed to the test projection beam at a position where they have the same optical characteristics. Then the laser converges to the center of the intermediate image of the test and produces on the retina a spot of minimum diameter. By varying the laser divergence, a spot of predetermined geometry, to which corresponds on the patient's retina an impact of predetermined geometry, is obtained in the above-defined conjugate plane. The combination of an attenuator with the laser adjustment within its stability range affords an accurate and reproducible selection of the value of the energy directed into the patient's eye. Thus, a photocoagulation of predetermined characteristics is obtained, independently of the patient's ametropia and, of course, of the physician's ametropia. A low-mass electromagnetic shutter responsive to an extremely sensitive switch provided with a safety device releases the laser beam at the end of the movement, after having blocked the physician's field of vision to prevent the light diffused by the laser impact from forming an image on the physician's retina. A timelag may be introduced into the shutter operation in order to make the physician insensitive thereto and enable him to make a nearly permanent observation. This timelag is provided for by a timing system incorporated in the laser generator.

In the following disclosure the optical principle will be described by simply exposing the original solutions lying outside the field of the known and conventional technology of optics and precision mechanics. Finally, the apparatus assembly and the method of operating same will be described.

DESCRIPTION OF THE DRAWING

The disclosure will now refer to the attached drawings in which:

FIG. 5 is a fragmentary exploded view showing also diagrammatically, in perspective with parts broken away, the arrangement of the movable assembly;

FIG. 6 shows diagrammatically the shutter built in the head of the ophthalmoscope;

FIG. 7 is a fragmentary exploded view showing diagrammatically in perspective one of the contacts for releasing the laser beam, with its safety valve in its open position;

FIG. 8 is a fragmentary side elevational and diagrammatical view, with parts shown in part section and parts broken away, of the optical-head and laser assembly according to this invention; and FIG. 9 is a fragmentary exploded view showing diagrammatically in perspective the same assembly extracted from the reference tube of the apparatus.

DESCRIPTION OF THE PREFERRED EMBODIMENT

Figure 1:
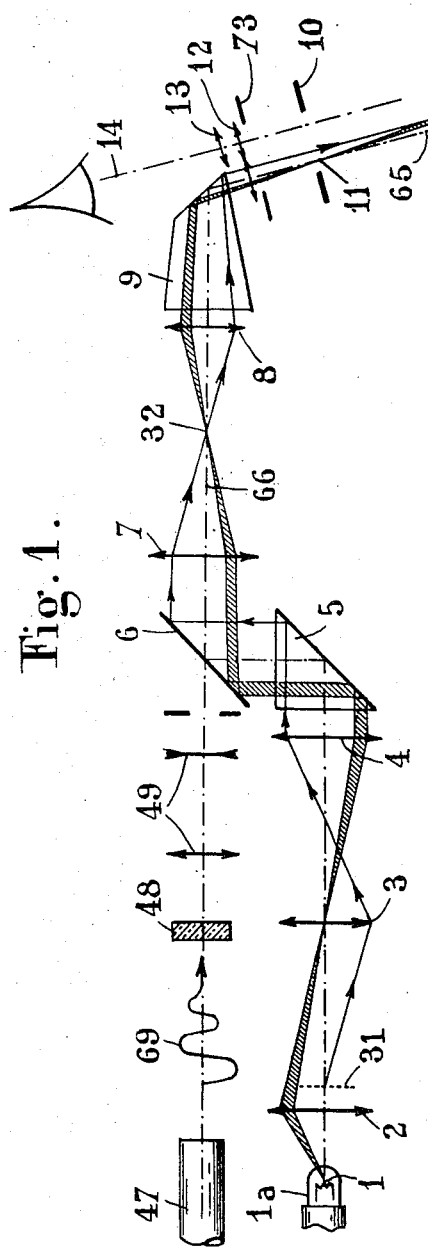
FIGS. 1, 2 and 3 are optical diagrams illustrating without any limiting sense the apparatus of this invention.
Figure 2:
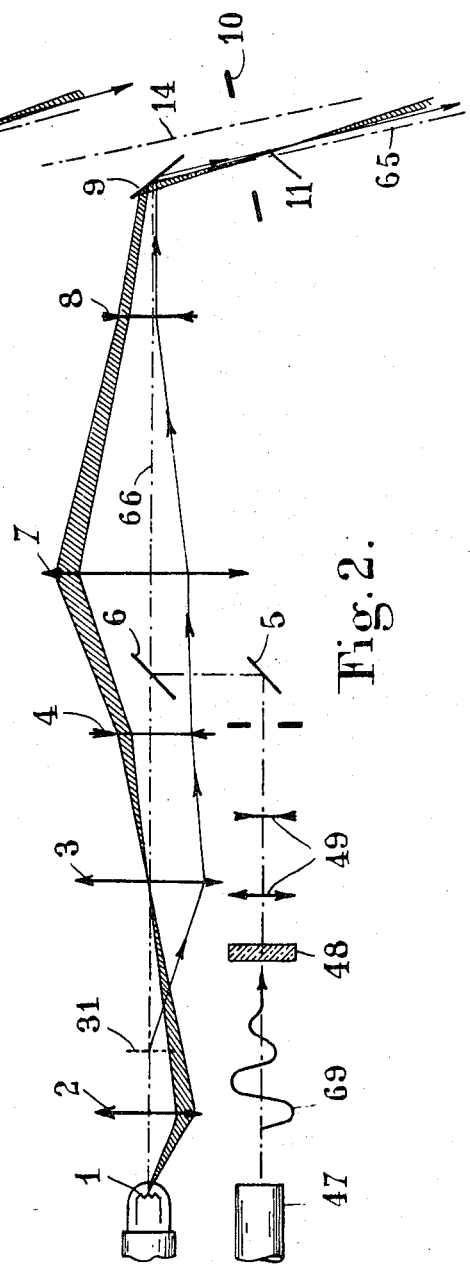
Figure 3:
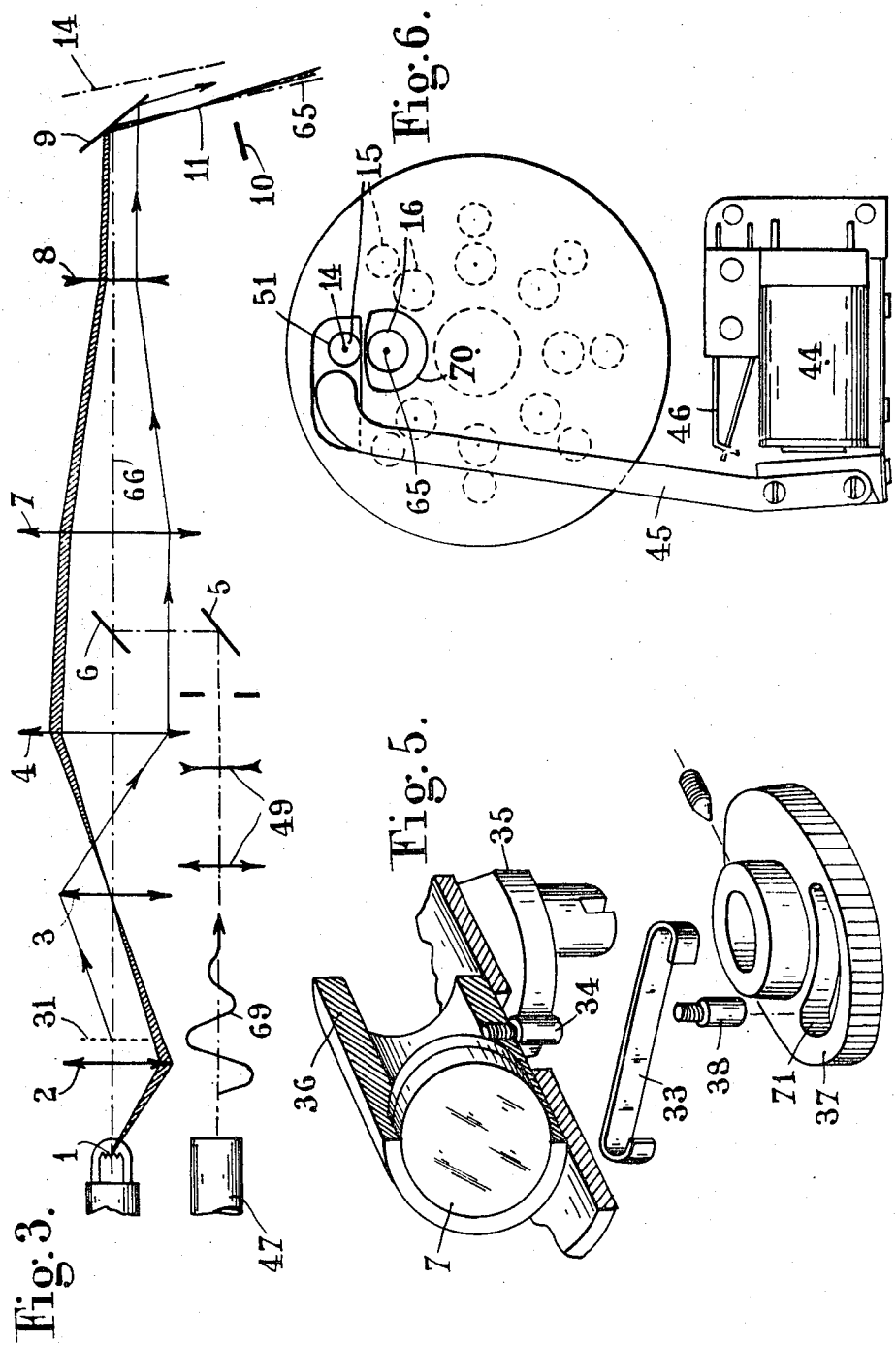

Referring to the drawings, FIG. 1 illustrates the optical diagram of the optical head of the apparatus; FIGS. 2 and 3 are equivalent diagrams differing from the diagram of FIG. 1 by the relative arrangement of the laser and by the nature of the real or virtual intermediate images. Of course, these illustrative diagrams may be combined together, if desired, without departing from the scope of the invention. The following description refers to FIG. 1 but is easily applicable by transposition to FIGS. 2 and 3 of which the equivalent components are designated by the same reference numerals.

The apparatus has four main functions:
illuminating the interior of the eye;
inspecting the interior of the eye;
projecting a reference test against the retina; and
photocoagulation, which are to take place in succession.

Illumination of the Interior of the Patient's Eye

From the energized filament 1 of a lamp 1a, a condenser 2, a pair of lenses 3 and 4, a total-reflection prism such as 5, a mirror 6, another lens 7, an objective 8 and another total reflection prism such as 9 give through the inner set of lenses 16 of a frontal Recoss disc 12, an image 11 directed by the physician towards the input pupilla 10 of the patient's eye. For obvious reasons of dimensional requirements, the projection axis 65 is inclined at 80° with respect to the axis 66 of the apparatus. Thus, the illuminating beam penetrates through the lower half of the input pupil of the patient's eye previously treated with atropine, i.e. dilated to a diameter approximating 8 mm.

Figure 4:
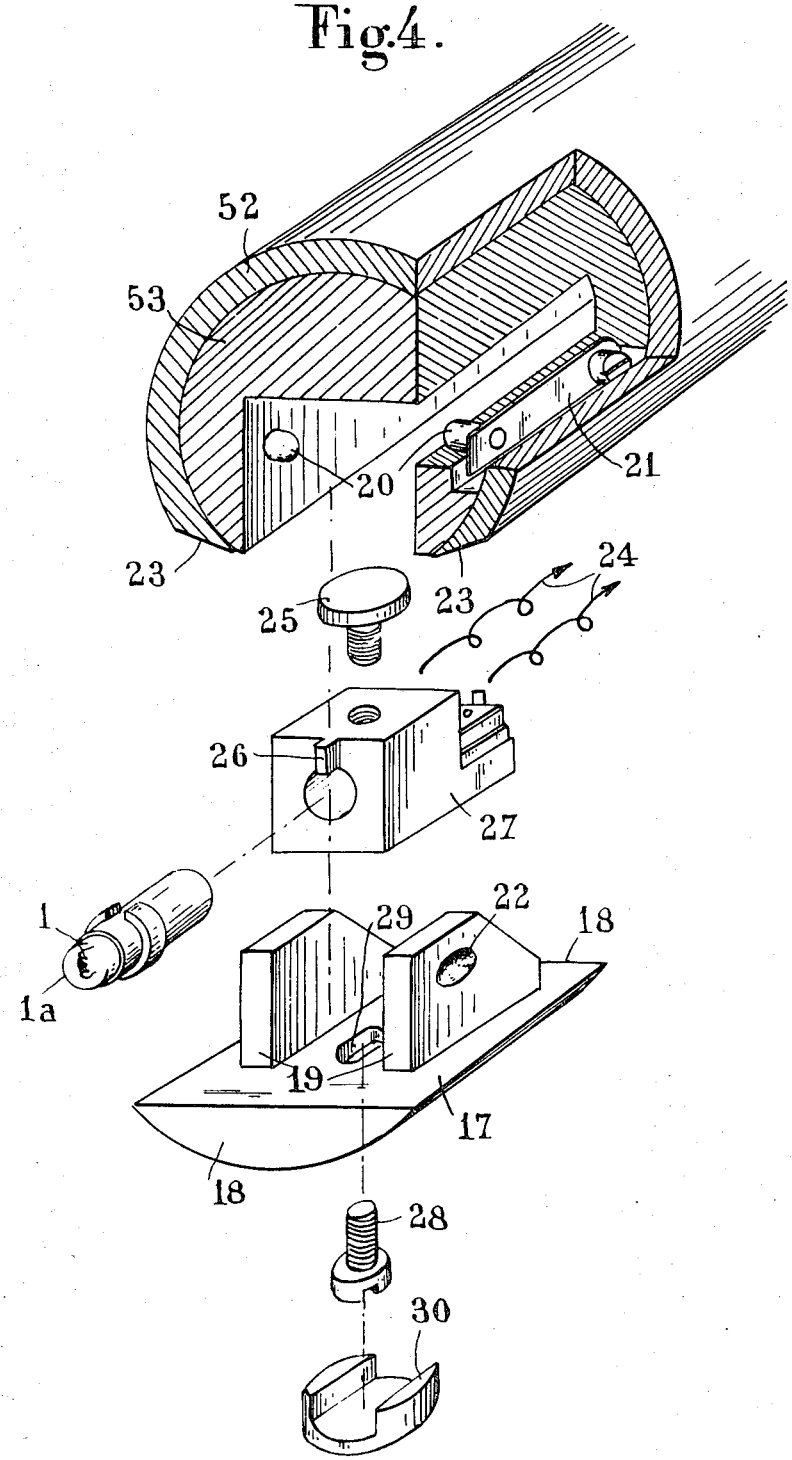
FIG. 4 is a fragmentary exploded view showing diagrammatically in perspective with parts broken away the positioning, adjustment and interchangeability of the lamp constituting the light source of the apparatus.

The lamp holder shown in exploded view in FIG. 4 permits of adjusting from the onset the distance from the filament image 11 to the outlet face 73 of the apparatus, and affords during the actual operation of the apparatus, a rapid interchangeability of the lamp 1a. The support or holder 17 retained in the body of the apparatus, i.e. the optical head 53, by the end flanges 18, the walls 19 and studs 20 urged by springs 21 into detentpositioning recesses 22, can easily be removed with the nails due to the provision of the sloped edges 23 in the reference tube 52 constituting the casing of the apparatus, without interfering with the electrical connection ensured via flexible conductors 24 leading to terminals carried by a body 27 mounted on said support 17 and adapted to receive the lamp 1a. Of course, these flexible conductors may be replaced by another suitable contact means such as pins, etc. To release the lamp 1 it is only necessary to rotate the knurled head of screw 25 counterclockwise, the angular position of this lamp being set by means of a projection 26 carried by said body 27. This initial adjustment is operated by releasing a screw 28 and causing the body 27 to slide relative to said holder 17, as permitted by an elongated hole 29; when the proper adjustment position is obtained, the screw 28 is tightened again through the hole 29 in the body 27, and its head is concealed by a cap 30.

Observation

The observation axis 14 lies immediately above the prism 9 and is inclined by 80° with respect to the axis 66 of the apparatus, like the projection axis 65. The amethropia compensation is obtained in the conventional manner by using two sets of lenses carried by two Recoss discs 12 and 13. Each disc is urged in its operative position by a spring-loaded roller engaging a corresponding notch formed in the peripheral edge of the disc.

The disc 13 on the physician's side comprises a single set of lenses 15 (FIG. 6) along the observation axis 14, which are disposed by increasing dioptre values ranging from $-9d$ to $+9d$. This disc is rotatably mounted on a large-diameter bearing comprising a hole 51 permitting the passage of light.

The disc 12 on the patient's side comprises two circular sets of lenses (15 and 16) as shown in FIG. 6, of identical optical power values, registering radially with the former. The power values are stepped from 5 to 5 dioptres in the range from $-20d$ to $+20d$.

The physician operates as follows: he firstly compensates the patient's ametrophia by reducing same to a value lying within the limits $-2\frac{1}{2}d$ to $+2\frac{1}{2}d$, by using only the lenses 15 of disc 12. This compensation is applied simultaneously to the light beam 65 passing through the hole 70 of the large-diameter bearing, by means of the set of lenses 16. He subsequently reduces to zero the residual differential ametropy by setting the disc 13. As a rule, this operation is facilitated by a previous knowledge of the ametropia values to be corrected.

Projection of the Reference Test

A test 31, for example in the form of crosslines, is illuminated by the condenser 2 and projected into the patient's eye by the lighting optical system and that particular lens of set 16 (FIG. 6) on the disc 12 which restores the patient's ametropia to a value lying within the range from $-2\frac{1}{2}d$ to $+2\frac{1}{2}d$. The lenses 3 and 4 give of test 31 an image to infinity which, after reflection by mirrors 5 and 6, gives an image 32 at the focus of lens 7.

By moving the lens 7 carried by a movable assembly 36 (i.e. by rotating a knurled control knob 37, FIG. 5) driving a cam 35 engaged by a follower 34 urged by a spring 33 contained in a recess of a supporting block or body (not shown), the cam movement being limited by a pin 38 screwed in said supporting block or body and engaged in an arcuate aperture 71 of said knob 37, the physician can move the image 32 and thus focus the test on the patient's retina of which 32 is then a conknurled knob 37 permits a preadjustment. On the other hand, the axis of this knob lies in the plane of symmetry of the apparatus and is therefore accessible from either side thereof.

Photocoagulation

The physician sets two lenses 49 (FIG. 1) lying on the path of the laser beam at a distance from each other which is read on a scale on the back of the instrument, by using an adjustment knob 74 for varying the laser divergence, and obtains the desired impact diameter of the laser beam 69.

By varying the laser divergence, the physician actually obtains in the conjugate plane 32 a spot of predetermined geometry to which corresponds an impact of definite geometry on the patient's retina.

Having determined on the other hand the energy density necessary for performing the photocoagulation, the physician adjusts the excitation of the crystal laser 47 within the stability range thereof, for example between 150 and 300 mj., and sets the energy level by means of an attenuator 48, according to the data shown by charts delivered with the instrument. This attenuator may consist for example of a barrel revolving in a plane disposed at right angles to the axis of the apparatus and presenting alternately across the path of the laser beam 69 absorbent glasses of, say 0, 3, 6 and 9 decibels. This barrel is driven simply by means of a toothed wheel 72 driven in turn by the pad of the thumb in the bottom of a groove, the geometrical arrangement of this groove being such that any undesired or accidental misadjustment is safely precluded during the operation.

Having thus completed all the necessary adjustments, the physician depresses with the tip of one finger one of the symmetrical valves 39 disposed in the bottom of one of the pairs of cavities 40 of the reference tube 52 of the apparatus. The thus actuated valve pushes a spring 41 engaged in a recess 50 of this valve and adapted to react against a pin 67 and also against the symmetrical closed-abutment valve 68. Then the practician depresses with the pad of the same finger a then released control member 42 which actuates a sensitive switch 43 to close the energizing circuit of an electromagnetic coil 44 (FIG. 6). Thus, the core of this coil 44 will attract a blade 45 to block the field of vision 51 and close another switch 46 controlling the laser operation. Therefore, a laser beam 69 is superposed to the light projection beam of the test, through the mirror 6, which may be perforated in its central portion or have a suitable selectivity. Either when the physician releases the control member 42, or when a timelag device opens the energizing circuit of coil 44, the blade 45 resumes its initial position, thus opening the field of vision and the switch 46. When the physician removes his finger from the cavity 40, the spring 41 is allowed to move the valve 39 against its stop to conceal completely the aforesaid control member 42, so that any accidental laser firing is safely prevented, for example during subsequent handlings.

Assembling and Operation

The complete apparatus is illustrated in FIG. 8. The optical head constitutes the assembly shown in diagrammatic form at 53 wherein the access to the knurled knob 37, to one of the valves 39, to the toothed wheel 72, to the adjustment knob 74 and to the Recoss discs 12 and 13, is clearly visible. This assembly 53 is housed in the reference tube 52 containing at its opposite end the laser 54, this end being closed by a washer 55 and a screw cap 56 comprising the passage for the connecting cable 57 leading to the laser generator.

The laser 54, the cable 57 and the connection leading to the generator constitute an interchangeable standard assembly which can easily be replaced at regular time intervals, without using any tool, this assembly being then sent to a workshop specialized in maintenance operations (e.g. changing the laser flashing unit, etc.), therefore practically without discontinuing The laser 54 is kept properly centered in the tube 52 by means of cylindrical journal portions 58 and 59 (FIG. 9) and an abutmenteforming flange 60 at its rear end, this flange engaging the rear end of tube 52. A cavity 61 of laser 54 is adapted to receive a projection 62 rigid with the optical head 53 for centering the laser 54 in relation to this head 53, i.e. the rotational positioning of the laser.

The external power supply is obtained automatically by means of a connector 63, 64 of which the two members are rigid respectively with the aforesaid projection 62 of the optical head 53 and with the cavity 61 of laser 54 (FIG. 9).

This external power supply leads respectively through wires 24 to the lamp 1a and to the electromagnetic shutter 43, 44 and 45, and additional connections are provided for controlling a laser release relay (i.e. by means of a wire from switch 46), as well as a ground connection (not shown).

The present invention is particularly advantageous due to its original principle and to its constructional features. These principle and features become readily apparent in actual operation, through the results obtained with the apparatus and its facility of operation.

The overall dimensions of the apparatus are equivalent to those of a simple observation ophthalmoscope.

The optical focusing is obtained by operating control members assembled in the conventional manner at the top of the apparatus and equally accessible from either side thereof. As the adjustment values are displayed on the scales and verniers, this adjustment can be effected beforehand, once the ametropia values are known to the physician. Any misadjustment will become immediately apparent through the test sharpness.

The laser controls are assembled in the center of the apparatus and are independent, of course, of the laser energization which, or course, is performed on the generator, not on the apparatus. These controls are tamper-proof in that they cannot be operated inadvertently. More particularly, each symmetrical firing control 42 is equipped with a safety valve 39 precluding any untimely release, for example during the handling by an assistant.

The low-mass shutter 45 (which therefore does not produce any shock in the apparatus itself) controlled by a high-sensitivity switch 43 cannot interfere with the sighting during the laser firing and ensures a reliable protection of the physician while affording a permanent or constant possibility of observation, since the shutter blocking time is extremely short (less than 0.1 second).

The apparatus is completely symmetrical and can be held indifferently with the left hand or the right hand.

After having determined experimentally the threshold of the energy necessary for carrying out the photocoagulation, the physician, with the assistance of the adjustment charts, can select in a reproducible manner impacts of different diameters (from about 0.1 to about 0.8 mm) and having the requisite energy density.

The energy density limitation in the case of impacts of relatively large diameter will warn the physician of the aging of the laser flashing unit so that a new one can be substituted therefor as a function of the use contemplated.

As it constitutes with its cable 57 and its connections with the generator an interchangeable subassembly, the laser 54 can be removed without using any particular tools, sent to a specialized workshop and replaced immediately with another laser. The simplicity of this substitution is such that it can be carried out during an operation. No complementary intervention is required since the external connections are made automatically.

The apparatus constitutes a particularly sturdy and foolproof unit.

This invention is applicable to the apparatus as a whole and of course also to the original devices contained therein, taken separately or in combination.

Outside the use suggested and contemplated hereinabove, the apparatus of this invention constitutes a useful instrument for laser indexing or centering for surgical or mechanical purposes; thus it can be used as a mechanical laser-operated indexing head.

Although a single form of embodiment of the invention has been illustrated and described, various changes in the form and relative arrangements of the parts may be made without departing from the spirit and scope of the invention as set forth in the appended claim.

I claim:

1. A portable photocoagulator consisting of an ophtalmoscope with a built-in laser, comprising a reference tube, a laser and an optical head, both housed in said reference tube, means for centering said laser in relation to said optical head, and means for centering said laser in relation to said reference tube, wherein said means for centering said laser in relation to said optical head consist of a cavity in said laser and of a pin rigid with said optical head, said pin being adapted to engage said cavity, and said means for centering said laser in said reference tube consist of cylindrical journal-forming portions adapted to engage the inner surface of the tube and of a flange-forming abutment at the rear end of said laser, said abutment being adapted to bear against the end face of said tube and to be held thereagainst by a screw cap fitted on the rear end of said tube.

2. A portable photocoagulator as set forth in claim 1, wherein said optical head comprises a first Recoss disc carrying two circular concentric sets of lenses registering radially with each other, namely an inner set and an outer set, for partially compensating the patient's ametropia, another Recoss disc carrying a single circular set of lenses corresponding to the external set of lenses of said first disc but with different lens values, for compensating the residual differential ametropia between the physician and the patient, an observation axis passing through the lenses of the registering sets of lenses of both Recoss discs, optical means for illuminating the interior of the patient's eye by means of a light beam issuing from a lamp and passing through the inner set of lenses of said first Recoss discs, said means forming the image of the lamp filament, said image being adapted to be positioned by the physician in the inlet pupilla of the patient, a test projected by said light beam onto the patient's retina and of which the intermediate image delivered by said optical means determines a conjugate plane of the retina, a movable assembly carrying a lens having said intermediate test image positioned at its focus, mechanical means for displacing said movable assembly and thus focusing said test on the retina, optical means for superposing on said test projection light beam a laser beam of predetermined divergence which forms in said conjugate plane a laser image of definite geometry to which corresponds, on the retina and centrally of said test, a laser impact of definite geometry, an attenuator consisting of absorbent glasses disposed across the path of said laser beam for adjusting, in combination with the adjustment of the laser excitation within its stability range, the density of the laser energy directed towards the patient's eye, a pair of electromagnetic switches disposed symmetrically on said optical head and adapted indifferently, the one or the other, to release the laser firing, an electromagnetic shutter responsive to said electromagnetic switches for blocking the field of vision of the physician strictly during the laser firing while giving to the physician the illusion of a permanent observation, and a spring-loaded sliding valve disposed in front of each one of said electromagnetic switches.

3. A portable photocoagulator as set forth in claim 1, wherein said means for centering said laser in relation to said optical head consist of a cavity in said laser and of a pin rigid with said optical head, said pin being adapted to engage said cavity, and said means for centering said laser in said reference tube consist of cylindrical journal-forming portions adapted to engage the inner surface of the tube and of a flange-forming abutment at the rear end of said laser, said abutment being adapted to bear against the end face of said tube and to be held thereagainst by a screw cap fitted on the rear end of said tube, and wherein said optical head comprises a first Recoss disc carrying two circular concentric sets of lenses registering radially with each other, namely an inner set and an outer set, for partially compensating the patient's ametropia, another Recoss disc carrying a single circular set of lenses corresponding to the external set of lenses of said first disc but with different lens values, for compensating the residual differential ametropia between the physician and the patient, an observation axis passing through the lenses of the registering sets of lenses of both Recoss discs, optical means for illuminating the interior of the patient's eye by means of a light beam issuing from a lamp and passing through the inner set of lenses of said first Recoss disc said means forming the image of the lamp filament, said image being adapted to be positioned by the physician in the inlet pupilla of the patient, a test projected by said light beam onto the patient's retina and of which the intermediate image delivered by said optical means determines a conjugate plane of the retina, a movable assembly carrying a lens having said intermediate test image positioned at its focus, mechanical means for displacing said movable assembly and thus focusing said test on the retina, optical means for superposing on said test projection light beam a laser beam of predetermined divergence which forms in said conjugate plane a laser image of definite geometry to which corresponds, on the retina and centrally of said test, a laser impact of definite geometry, an attenuator consisting of absorbent glasses disposed across the path of said laser beam for adjusting, in combination with the adjustment of the laser excitation within its stability range, the density of the laser energy directed towards the patient's eye, a pair of electromagnetic switches disposed symmetrically on said optical head and adapted indifferently, the one or the other, to release the laser firing, an electromagnetic shutter responsive to said electromagnetic switches for blocking the field of vision of the physician strictly during the laser firing while giving to the physician the illusion of a permanent observation, and a spring-loaded sliding valve disposed in front of each one of said electromagnetic switches.

4. A portable photocoagulator as set forth in claim 3, wherein said laser constitutes an interchangeable standard assembly.